United States Patent
Sugano

(10) Patent No.: US 7,711,541 B2
(45) Date of Patent: May 4, 2010

(54) CHINESE INPUT METHOD, CHINESE INPUT DEVICE, AND COMPUTER-READABLE MEDIUM

(75) Inventor: Jin Sugano, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 1290 days.

(21) Appl. No.: 10/818,636

(22) Filed: Apr. 6, 2004

(65) Prior Publication Data

US 2005/0049861 A1 Mar. 3, 2005

(30) Foreign Application Priority Data

Aug. 28, 2003 (JP) .............................. 2003-305298

(51) Int. Cl.
*G06F 17/28* (2006.01)

(52) U.S. Cl. ...................... 704/3; 704/2; 704/7; 704/8; 715/264; 345/168; 345/171

(58) Field of Classification Search ................. 704/2–8; 715/265; 345/168, 171; 341/28; 382/185
See application file for complete search history.

(56) References Cited

U.S. PATENT DOCUMENTS

| | | | |
|---|---|---|---|
| 6,307,541 B1 * | 10/2001 | Ho et al. ...................... 345/171 |
| 6,982,658 B2 | 1/2003 | Guo |
| 6,562,078 B1 * | 5/2003 | Yang et al. ................... 715/202 |
| 6,801,659 B1 * | 10/2004 | O'Dell ........................ 382/185 |
| 6,809,725 B1 * | 10/2004 | Zhang ......................... 345/171 |
| 7,058,900 B2 | 6/2006 | Sugano |
| 7,165,021 B2 | 1/2007 | Sugano |
| 7,165,022 B2 | 1/2007 | Sugano |
| 2002/0135499 A1 * | 9/2002 | Guo ............................ 341/23 |
| 2002/0158779 A1 * | 10/2002 | Ouyang ....................... 341/28 |

FOREIGN PATENT DOCUMENTS

JP 2003-067375 3/2003

* cited by examiner

*Primary Examiner*—David R Hudspeth
*Assistant Examiner*—Lamont M Spooner
(74) *Attorney, Agent, or Firm*—Greer, Burns & Crain, Ltd.

(57) ABSTRACT

At a first step, initial groups are assigned to buttons of an input portion and they are displayed on the display. One initial group is specified in response to the pressed button. At a second step, complex initials and predetermined syllables are assigned to the buttons and they are displayed on the display. One complex initial or one predetermined syllable is specified in response to the pressed button. At a third step, finals are assigned to the buttons and they are displayed on the display. One final is specified in response to the pressed button and a syllable is determined by connecting the specified final with the initial in the specified complex initial. The predetermined syllable specified at the second step or the syllable determined at the third step is determined as an input syllable.

9 Claims, 18 Drawing Sheets

FIG.3

| | Nothing | b | p | m | f | d | t | n | l | g | k | h | j | q | x | zh | ch | sh | r | z | c | s |
|---|---|---|---|---|---|---|---|---|---|---|---|---|---|---|---|---|---|---|---|---|---|---|
| a | O | O | O | O | O | O | O | O | O | O | O | O | | | | O | O | O | | O | O | O |
| o | O | O | O | O | O | | | | | | | | | | | | | | | | | |
| e | O | | | | | O | O | O | O | O | O | O | | | | O | O | O | O | O | O | O |
| ê | O | | | | | | | | | | | | | | | | | | | | | |
| er | O | | | | | | | | | | | | | | | | | | | | | |
| -i* | | | | | | | | | | | | | | | | O | O | O | O | O | O | O |
| ai | O | O | O | O | O | | O | O | O | O | O | O | | | | O | O | O | | O | O | O |
| ei | O | O | O | O | O | O | O | O | | O | | O | | | | O | | O | | O | | |
| ao | O | O | O | O | | O | O | O | O | O | O | O | | | | O | O | O | O | O | O | O |
| ou | O | | O | O | O | O | O | | O | O | O | O | | | | O | O | O | O | O | O | O |
| an | O | O | O | O | O | O | O | O | O | O | O | O | | | | O | O | O | O | O | O | O |
| en | O | O | O | O | O | | | O | | O | O | O | | | | O | O | O | O | O | O | O |
| ang | O | O | O | O | O | O | O | O | O | O | O | O | | | | O | O | O | O | O | O | O |
| eng | O | O | O | O | O | O | O | O | O | O | O | O | | | | O | O | O | O | O | O | O |
| -i | O | O | O | O | | O | O | O | O | | | | O | O | O | | | | | | | |
| ia | O | | | | | | | O | | | | | O | O | O | | | | | | | |
| ie | O | O | O | O | | O | O | O | O | | | | O | O | O | | | | | | | |
| iao | O | O | O | O | | O | O | O | O | | | | O | O | O | | | | | | | |
| iou | O | | O | | | O | | O | O | | | | O | O | O | | | | | | | |
| ian | O | O | O | O | | O | O | O | O | | | | O | O | O | | | | | | | |
| in | O | O | O | O | | | | O | O | | | | O | O | O | | | | | | | |
| iang | O | | | | | | | O | O | | | | O | O | O | | | | | | | |
| ing | O | O | O | O | | O | O | O | O | | | | O | O | O | | | | | | | |
| u | O | O | O | O | O | O | O | O | O | O | O | O | | | | O | O | O | O | O | O | O |
| ua | O | | | | | | | | | O | O | O | | | | O | O | O | | | | |
| uo | O | | | | | O | O | O | O | O | O | O | | | | O | O | O | O | O | O | O |
| uai | O | | | | | | | | | O | O | O | | | | O | O | O | | | | |
| uei | O | | | | | O | O | | | O | O | O | | | | O | O | O | O | O | O | O |
| uan | O | | | | | O | O | O | O | O | O | O | | | | O | O | O | O | O | O | O |
| ue | O | | | | | O | O | O | O | O | O | O | | | | O | O | O | O | O | O | O |
| uang | O | | | | | | | | | O | O | O | | | | O | O | O | | | | |
| ueng | O | | | | | | | | | | | | | | | | | | | | | |
| ong | | | | | | O | O | O | O | O | O | O | | | | O | O | | O | O | O | O |
| ü | O | | | | | | | O | O | | | | O | O | O | | | | | | | |
| üe | O | | | | | | | O | O | | | | O | O | O | | | | | | | |
| üa | O | | | | | | | | | | | | O | O | O | | | | | | | |
| ün | O | | | | | | | | | | | | O | O | O | | | | | | | |
| üong | O | | | | | | | | | | | | O | O | O | | | | | | | |

FIG.5

| 1 | bp |
| --- | --- |
| 2 | mf |
| 3 | dt |
| 4 | nl |
| 5 | gkh |
| 6 | jz |
| 7 | qc |
| 8 | xs |
| 9 | r' |

FIG.6

|   | 1 | 2 | 3 | 4 | 5 | 6 | 7 | 8 | 9 | * | 0 | # |
|---|---|---|---|---|---|---|---|---|---|---|---|---|
| 1 | b- | bi | p- | bi- | pi | pi- | bu | ba | pu | bo | pa | po |
| 2 | m- | ma | f- | mi- | fa | fi- | mu | mi | fu | mo | me | fo |
| 3 | d- | da | t- | di- | ta | ti- | du- | de | tu- | di | du | ti |
| 4 | n- | li | l- | ni- | ni | li- | nu- | le | lu- | nv | na | lu |
| 5 | g- | k- | h- | ge | ke | he | gu- | ku- | hu- | gu | ku | hu |
| 6 | ji | zh- | z- | ji- | zhi | zi | ju | zhu- | zu- | ju | zhu | zhe |
| 7 | qi | ch- | c- | qi- | chi | ci | qu | chu- | cu- | qu | chu | che |
| 8 | xi | sh- | s- | xi- | shi | si | xu- | shu- | su- | xu | shu | she |
| 9 | r- | yi | - | ri | yu | y- | ru- | wu | w- | er | wo | yu- |

FIG.7

| | 1 a | 2 ai | 3 an | 4 ang | 5 ao | 6 e | 7 ei | 8 en | 9 eng | * o | 0 ong | # ou |
|---|---|---|---|---|---|---|---|---|---|---|---|---|
| b- | O | O | O | O | O |   | O | O | O | O |   |   |
| p- | O | O | O | O | O | O | O | O | O | O |   | O |
| m- | O | O | O | O | O |   | O | O | O | O |   | O |
| f- | O |   | O | O |   |   | O | O | O | O |   | O |
| d- | O | O | O | O | O | O | O |   | O |   | O | O |
| t- | O | O | O | O | O | O | O | O | O |   | O | O |
| n- | O | O | O | O | O | O | O | O | O | O | O | O |
| l- | O | O | O | O | O | O | O | O | O |   | O | O |
| g- | O | O | O | O | O | O |   | O | O |   | O | O |
| k- | O | O | O | O | O | O | O | O | O |   | O | O |
| h- | O | O | O | O | O | O | O | O | O |   | O | O |
| zh- | O | O | O | O | O | O | O | O | O | O | O | O |
| z- | O | O | O | O | O | O |   | O | O | O | O | O |
| ch- | O | O | O | O | O | O |   | O | O | O | O | O |
| c- | O | O | O | O | O | O |   | O | O | O | O | O |
| sh- | O | O | O | O | O | O | O | O | O | O |   | O |
| s- | O |   | O | O | O | O |   | O | O | O |   | O |
| r- |   |   | O | O | O | O | O | O | O | O | O | O |

FIG. 8

| | 1 i | 2 ia | 3 ian | 4 iang | 5 iao | 6 ie | 7 in | 8 ing | 9 iong | * iu | 0 | # |
|---|---|---|---|---|---|---|---|---|---|---|---|---|
| bi- | O | | O | | O | O | O | O | | | | |
| pi- | O | | O | | O | O | O | O | | | | |
| mi- | O | | O | | O | O | O | O | | O | | |
| fi- | | | | | | | | | | | | |
| di- | O | O | O | | O | O | O | O | | O | | |
| ti- | O | | O | | O | O | O | O | | | | |
| ni- | O | | O | O | O | O | O | O | | O | | |
| li- | O | O | O | O | O | O | O | O | | O | | |
| ji- | O | O | O | O | O | O | O | O | O | O | | |
| qi- | O | O | O | O | O | O | O | O | O | O | | |
| xi- | O | O | O | O | O | O | O | O | O | O | | |

FIG.9

| | 1 | 2 | 3 | 4 | 5 | 6 | 7 | 8 | 9 | * | 0 | # |
|---|---|---|---|---|---|---|---|---|---|---|---|---|
| | u | ua | uai | uan | uang | ue/üe | ui | un | uo | ü | | |
| du- | O | | | O | | | | O | O | | | |
| tu- | O | | | O | | | | O | O | | | |
| nu- | O | | | O | | | | | O | O | | |
| lu- | O | | | O | | | | | O | O | | |
| gu- | O | O | O | O | O | | O | O | O | | | |
| ku- | O | O | O | O | O | | O | O | O | | | |
| hu- | O | O | O | O | O | | O | O | O | | | |
| ju- | O | | | O | | O | | O | | | | |
| zhu- | O | O | O | O | O | | O | O | O | | | |
| zu- | O | | | O | | | O | O | O | | | |
| qu- | O | | | O | | O | | O | | | | |
| chu- | O | O | O | O | O | | O | O | O | | | |
| cu- | O | | | O | | | O | O | O | | | |
| xu- | O | | | O | | O | | O | | | | |
| shu- | O | O | O | O | O | | O | O | O | | | |
| su- | O | | | O | | | O | O | O | | | |
| ru- | O | | | O | | | O | O | O | | | |

FIG.10

| bp | mf  | dt |
|----|-----|----|
| nl | gkh | jz |
| qc | xs  | r' |
|    |     |    |

FIG.11A

After selecting "bp"

| b- | bi | p- |
|---|---|---|
| bi- | pi | pi- |
| bu | ba | pu |
| bo | pa | po |

FIG.11B

After selecting "mf"

| m- | ma | f- |
|---|---|---|
| mi- | fa | fi- |
| mu | mi | fu |
| mo | me | fo |

FIG.11C

After selecting "dt"

| d- | da | t- |
|---|---|---|
| di- | ta | ti- |
| du- | de | tu- |
| di | du | ti |

FIG.11D

After selecting "nl"

| n-  | li | l-  |
|-----|----|-----|
| ni- | ni | li- |
| nu- | le | lu- |
| nv  | na | lu  |

FIG.11E

After selecting "gkh"

| g-  | k-  | h-  |
|-----|-----|-----|
| ge  | ke  | he  |
| gu- | ku- | hu- |
| gu  | ku  | hu  |

FIG.11F

After selecting "jz"

| ji  | zh-  | z-  |
|-----|------|-----|
| ji- | zhi  | zi  |
| ju- | zhu- | zu- |
| ju  | zhu  | zhe |

FIG.11G

After selecting "qc"

| qi  | ch-  | c-  |
|-----|------|-----|
| qi- | chi  | ci  |
| qu- | chu- | cu- |
| qu  | chu  | che |

FIG.11H

After selecting "xs"

| xi  | sh-  | s-  |
|-----|------|-----|
| xi- | shi  | si  |
| xu- | shu- | su- |
| xu  | shu  | she |

FIG.11I

After selecting "r"

| r-  | yi  | -   |
|-----|-----|-----|
| ri  | yu  | y-  |
| ru- | wu  | w-  |
| er  | wo  | yu- |

FIG.12A

| a | ai | an |
|---|----|-----|
| ang | ao | e |
| ei | en | eng |
| o | ong | ou |

FIG.12B

| i | ia | ian |
|---|-----|-----|
| iang | iao | ie |
| in | ing | iong |
| iu | | |

FIG.12C

| u | ua | uai |
|---|-----|-----|
| uan | uang | ue |
| ui | un | uo |
| v | | |

FIG.14A

| bp | mf | dt |
|---|---|---|
| nl | gkh | jz |
| qc | xs | r' |
|  |  |  |

| dt | | |
|---|---|---|
| d- | da | t- |
| di- | ta | ti- |
| du- | de | tu- |
| di | du | ti |

| di- | | |
|---|---|---|
| i | ia | ian |
| iang | iao | ie |
| in | ing | iong |
| iu |  |  |

③jan ↓

| 点 | | |
|---|---|---|
| bp | mf | dt |
| nl | gkh | jz |
| qc | xs | r' |
|  |  |  | gkh ↓

| 点gkh | | |
|---|---|---|
| g- | k- | h- |
| ge | ke | he |
| gu- | ku- | hu- |
| gu | ku | hu | hu- ↓

| 点hu- | | |
|---|---|---|
| u | ua | uai |
| uan | uang | ue |
| ui | un | uo |
| v |  |  | ua ↓

FIG.14G
| 電話 | | |
|---|---|---|
| bp | mf | dt |
| nl | gkh | jz |
| qc | xs | r' |
| | | |
⑥jz
FIG.14H
| 電話jz | | |
|---|---|---|
| ji | zh- | z- |
| ji- | zhi | zi |
| ju- | zhu- | zu- |
| ju | zhu | zhe |
①ji
FIG.14I
| 電話機 | | |
|---|---|---|
| bp | mf | dt |
| nl | gkh | jz |
| qc | xs | r' |
| | | |

CHINESE INPUT METHOD, CHINESE INPUT DEVICE, AND COMPUTER-READABLE MEDIUM

BACKGROUND OF THE INVENTION

1. Field of the Invention

The present invention relates to a Chinese character input method with limited number of buttons.

2. Prior Art

A conventional Chinese input method converts an input syllable into a Chinese character. In the main land of China, a syllable is input by Pinyin. In Taiwan, a syllable is input by Zhuyin.

Every Chinese character consists of one syllable. For the Pinyin method, one syllable is represented by one through six alphabetic character(s). Therefore, even if a keyboard that has twenty-six buttons corresponding to twenty-six alphabetic characters is used, one through six keystroke(s) is (are) required.

Further, a Chinese syllable consists of an initial corresponding to a consonant part and a final corresponding to a vowel part. An initial consists of a single consonant and a final consists of three parts at the maximum. A semi-vowel (transition vowel) may intervene between an initial and a final. A semi-vowel may belong to the initial by connecting with a consonant (in the specification, a combination of an initial and a semi-vowel is referred to as a "complex initial"), or a semi-vowel may belong to the final. On the other hand, when a consonant follows the vowel in the final, the consonant belongs to the final.

An input method using such a structure of a Chinese syllable has been known. In this method, an operator determines a syllable by one keystroke to specify an initial and one keystroke to specify a final. However, this method requires a keyboard having about thirty buttons for inputting the initial and the final.

The above-described Chinese input methods are designed for a general computer having a full-keyboard. In recent years, a Chinese input method for an information device having about twelve buttons such as a cellular phone and PDA is required. In response to the requirement, various methods have been developed to input a Chinese syllable with the fewest possible number of keystrokes using small numbers of buttons.

For example, a input method used in a cellular phone on the market requires a first keystroke to select an initial group containing a plurality of initials, a second keystroke to select an initial vowel of a final, a third keystroke to select a final (a plurality of finals may be assigned to a button), and fourth and subsequent keystrokes to specify a desirable Chinese character from the candidates that belong to the syllables defined by the selected initials and the selected finals.

However, the input method used in a cellular phone cannot specify a syllable with three keystrokes for all kinds of syllables. In some cases, since the three keystrokes merely extract the syllables as candidates, an operator must specify the target character from many candidates, which complicates the input operation.

U.S. patent application No. 20020193984 discloses the Chinese language input system that enables to specify a syllable with three keystrokes using nine through twelve buttons as the first embodiment. In the first embodiment, a first keystroke selects an initial group, a second keystroke selects the initial and a final group, and a third keystroke selects the final. The publication also discloses the Chinese input method that specifies a syllable with two through four keystrokes as the second embodiment. In the second embodiment, a first keystroke selects a sound group, a second keystroke specifies a syllable that consists of an initial and a simple final (a final having a single vowel), a third keystroke specifies a syllable that consists of an initial and a final without a semi-vowel, and a fourth keystroke specifies a syllable that consists of an initial and a final with a semi-vowel. The input method of the second embodiment can specify a syllable that consists an initial and a simple final with only two keystrokes.

However, the Chinese input method of the first embodiment disclosed in the publication can specify all kinds of syllables with three keystrokes, while it cannot specify any syllables with two keystrokes. On the other hand, the method of the second embodiment of the publication can specify a syllable that consists of an initial and a simple final with two keystrokes, while it requires four keystrokes to specify a syllable that consists of an initial and a final with a semi-vowel.

Further, the final groups are symbolized by different symbols in the first embodiment disclosed in the publication. That is, the simple final is symbolized by "?", a complex final transcribed with letters without a semi-vowel is symbolized by "*", a complex final with a semi-vowel "i" is symbolized by "i*", a complex final with a semi-vowel "u" is symbolized by "u*", and a complex final with a semi-vowel "v" is symbolized by "v*". Therefore, a user must understand the meanings of the symbols "?" and "*".

SUMMARY OF THE INVENTION

A main object of the present invention is to provide an improved Chinese character input method that enables to specify all kinds of syllables with three keystrokes and to specify frequently used syllables with only two keystrokes.

An auxiliary object of the present invention is to provide a Chinese character input method that eliminates the classification of finals into three groups for simple finals, complex finals without semi-vowels and complex finals with semi-vowels, and to provide a viscerally understandable input method for a user by classifying the finals by only the kinds of semi-vowels.

A Chinese character input method of the present invention for inputting a Chinese syllable that consists of an initial and a final to a computer having an input portion, the computer including a first table that stores finals classified into groups and a second table that stores complex initials each of which is a combination of the initial and identifying information of the final group and predetermined syllables, includes a first step for specifying an initial in response to an operation of the input portion, a second step for specifying one of complex initials or one of predetermined syllables that are retrieved from the second table based on the initial specified at the first step in response to an operation of the input portion, and a third step for specifying one of finals that belong the group represented by the identifying information in the complex initial specified at the second step from the first table in response to an operation of the input portion and for determining a syllable by connecting the specified final with the initial in the specified complex initial when one of the complex initial is specified at the second step, wherein the predetermined syllable specified at the second step or the syllable determined at the third step is determined as the input syllable.

With this method, one or more initials are specified at the first step, one of the predetermined syllables containing the initial specified at the first step is determined as the input syllable or the complex initials that consists of the initials and the identifying information of the finals are specified, and the syllable consists of one of finals represented by the identifying information in the complex initial and the initial in the complex initial as the input syllable. Therefore, when one of the predetermined syllables is determined as the input syllable, it requires only two operations in the first and second steps. Further, when another syllable is determined as the input syllable, it requires only three operations in the first, second and third steps.

If the number of buttons (switches or keys) of the input portion is larger than the total number of the initial, the initials can be assigned to the buttons one-by-one. On the other hand, when the number of the buttons is smaller than the total number of the initials, the initial groups including some initials may be assigned to the respective buttons. In later case, a plurality of the predetermined syllables can become the candidate to be specified. The number of the predetermined syllables N is calculated by the following equation.

$$N = B - C \times V$$

Where B is the total number of buttons, C is the number of the initials in the specified initial group and V is the number of final groups. Since there are unavailable combinations of initials and the finals, the actual number of the predetermined syllables that can be specified at the second step can be larger than the theoretical number N.

Frequently used syllables should be the predetermined syllables in order to decrease the total keystrokes. For example, frequently used syllables having a simple final is desirable.

Further, the fewer the number of the final groups is, the larger the number of the predetermined syllables that can be specified at the second step is. However, the number of the finals in the respective vowel group should be smaller than the total number of the buttons. The finals are classified in consideration of the balance between the above two requirements. For instance, when the simple finals and the complex finals having the same initial Pinyin ("u umlaut" shown as "v" is regarded as the same as "u") are classified into the same group and the final groups having the same wide-open-mouth final are brought together, the finals can be classified into three groups and the number of the finals in each group is smaller than twelve. Accordingly, when the input portion has twelve buttons, at least N' (N'=12−C×3) buttons can be assigned to the predetermined syllables that can be specified at the second step.

As described above, each method of the present invention classifies semi-vowels according to its original definition that is different from the definition of the Chinese phonemics. That is, the simple final "i" is regarded as a semi-vowel and the "i semi-vowel" of the Chinese phonemics is re-defined as an "I semi-vowel" containing the simple final "i". In the similar manner, the simple finals "u" and "u umlaut" are regarded as semi-vowels and the "u semi-vowel" of the Chinese phonemics is re-defined as a "U semi-vowel" containing the simple finals "u" and "u umlaut". Each final that cannot be connected with the "I semi-vowel" and "U semi-vowel" is regarded that it connects with a "zero semi-vowel", and the "zero semi-vowel" is also defined as one of semi-vowels. All the finals are classified into three final groups by the re-defined semi-vowels to which the finals are connected. That is, there are a "final with zero semi-vowel group" containing finals that can be connected with the "zero semi-vowel", a "final with I semi-vowel group" containing finals that can be connected with only the "I semi-vowel" and a "final with U semi-vowel group" containing finals that can be connected with only the "U semi-vowel".

In this case, when the combinations of the initial specified at the first step and the final group are assigned to the buttons, it is preferable to display the contents of the initial and the identifying information (that is a semi-vowel and a predetermined symbol) on the regions corresponding to the buttons. In accordance with the definition of the complex initial, the combination of the initial and the semi-vowel is also included in the scope of the complex initial. Accordingly, since only one kind of symbol is required to distinguish the predetermined syllables and the unspecified complex initial in addition to Pinyin, a user is not required to remember the distinctions of symbols. If the target syllable is assigned to the button, the user presses the button. If the target syllable is not assigned to the button, the user presses the button to which the complex initial containing the initial vowel of the desired final as the identifying information (semi-vowel and predetermined symbol). If such a complex initial is not assigned to the button, the user presses the button to which the complex initial containing the identifying information (zero semi-vowel and predetermined symbol). As a result, the user can specify the final group by the kinds of the semi-vowels, which enables to provide the viscerally understandable input method for a user.

With the Chinese character input method of the present invention, all kinds of syllables can be specified with three keystrokes and frequently used syllables can be specified with only two keystrokes.

DESCRIPTION OF THE ACCOMPANYING DRAWINGS

FIG. 3 is a table showing syllables of the standard Chinese language;

FIG. 5 shows the data structure of an initial group display table;

FIG. 6 shows the data structure of a syllable display table for complex initials and simple finals;

FIG. 7 shows the data structure of a connection table of complex initials and finals with zero semi-vowels;

FIG. 8 shows the data structure of a connection table of complex initials and finals with I semi-vowels;

FIG. 9 shows the data structure of a connection table of complex initials and finals with U semi-vowels;

FIG. 10 shows a sample image displayed in an input candidate display area in the Chinese character input mode (at a step for selecting an initial group);

FIGS. 11A through 11I show sample images displayed in the input candidate display area at a step for selecting complex initial;

FIGS. 12A through 12C show sample images displayed in the input candidate display area at a step for selecting final;

FIGS. 14A through 14I show changes of images on a display when Chinese characters are actually input.

DESCRIPTION OF THE PREFERRED EMBODIMENTS

Figure 1:
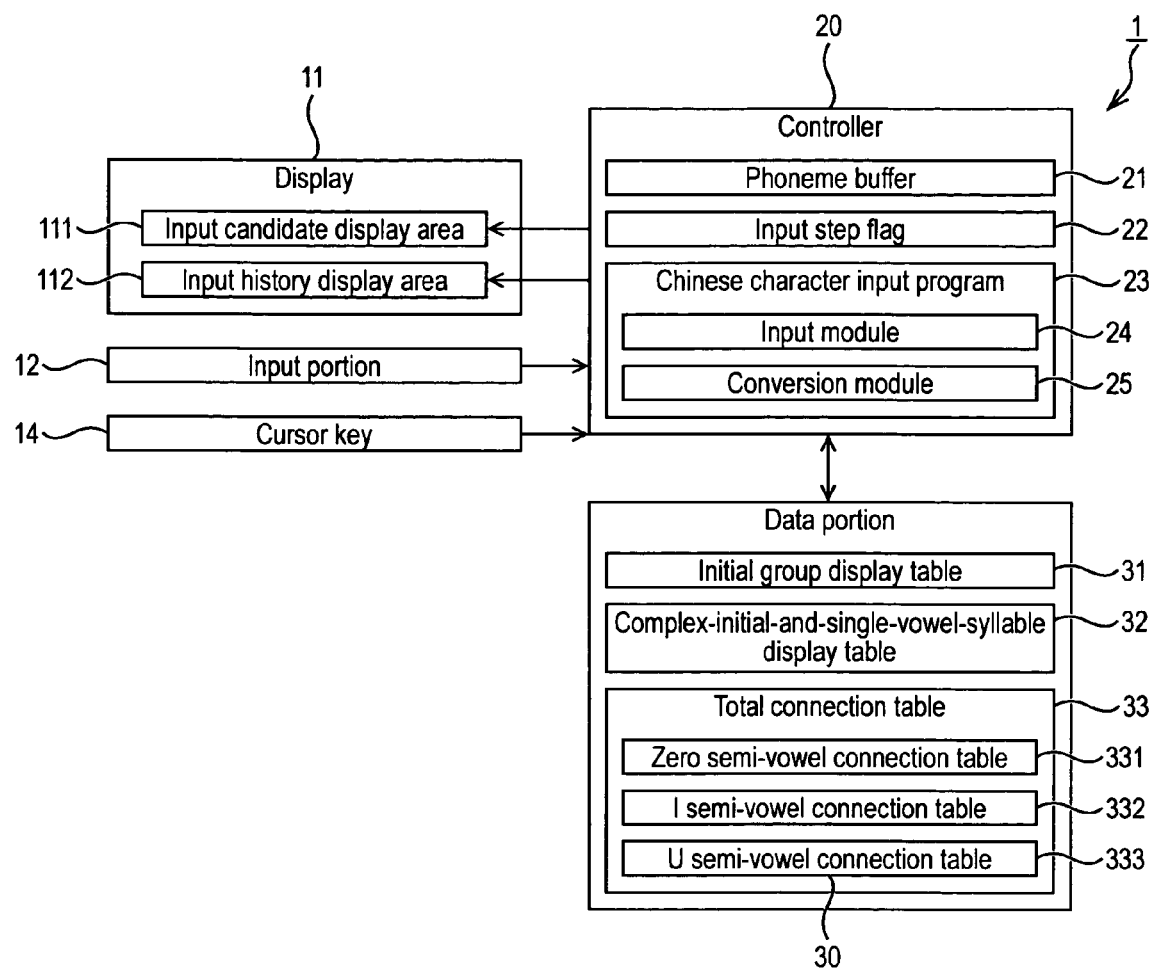
FIG. 1 is a block diagram showing structure of a device to which a Chinese character input method of an embodiment according to the present invention is applied.

An embodiment of the present invention will be described with reference to the drawings.

Chinese Character Input Method

Hereinafter, the Chinese character input method of the embodiment that is executed using twelve buttons will be described. The twelve buttons correspond to ten numerical buttons ("0" through "9"), a sharp button ("#") and an asterisk button ("*") of a cellular phone. In the following description, the numerals and symbols indicated on the buttons are referred to as button codes.

Structure of Syllable

As described above, a syllable consists of an initial and a final according to the Chinese phonemics. A semi-vowel (pre-vocalic glide) may intervene between an initial and a final. The semi-vowel may belong to the final. On the other hand, when a semi-vowel is connected to an initial, the semi-vowel is referred to as a complex initial in this specification.

FIG. 3 is a table showing syllables of Chinese by Pinyin that includes phonetic symbols of Chinese used in the main land of China. Each row of the table of FIG. 3 corresponds to an initial and each column corresponds a final (including a simple final, a complex final without semi-vowel and a complex final with semi-vowel). In the table of FIG. 3, "u umlaut" is represented by "v". A syllable is determined as a combination of one initial selected from the rows and one final selected from the columns. For syllables consisting of final only, the row of "nothing" is prepared in the table. This "nothing" means zero initial of the Chinese phonemics.

In addition, the Chinese language does not use all the syllables of the combinations of the respective rows and columns. That is, 403 kinds of syllables marked by "O" are available, while the combinations without marks are not available. Almost all the syllables used in standard Chinese are included in these 403 kinds of the combinations. However, some special syllables that are not represented by the combinations of FIG. 3 are used. The special syllables are "m", "n", "hng", "ng", "yo(io)". The 403 kinds of syllables and these special syllables cover all syllables of the standard pronunciations of Chinese character defined in GB2312.

There are twenty and more kinds of initials and thirty and more kinds of finals in the Chinese language. Accordingly, when twelve buttons are used, an initial cannot be specified by one keystroke. In the same manner, a final cannot be specified by one keystroke.

Step for Selecting Initial

Figure 5:
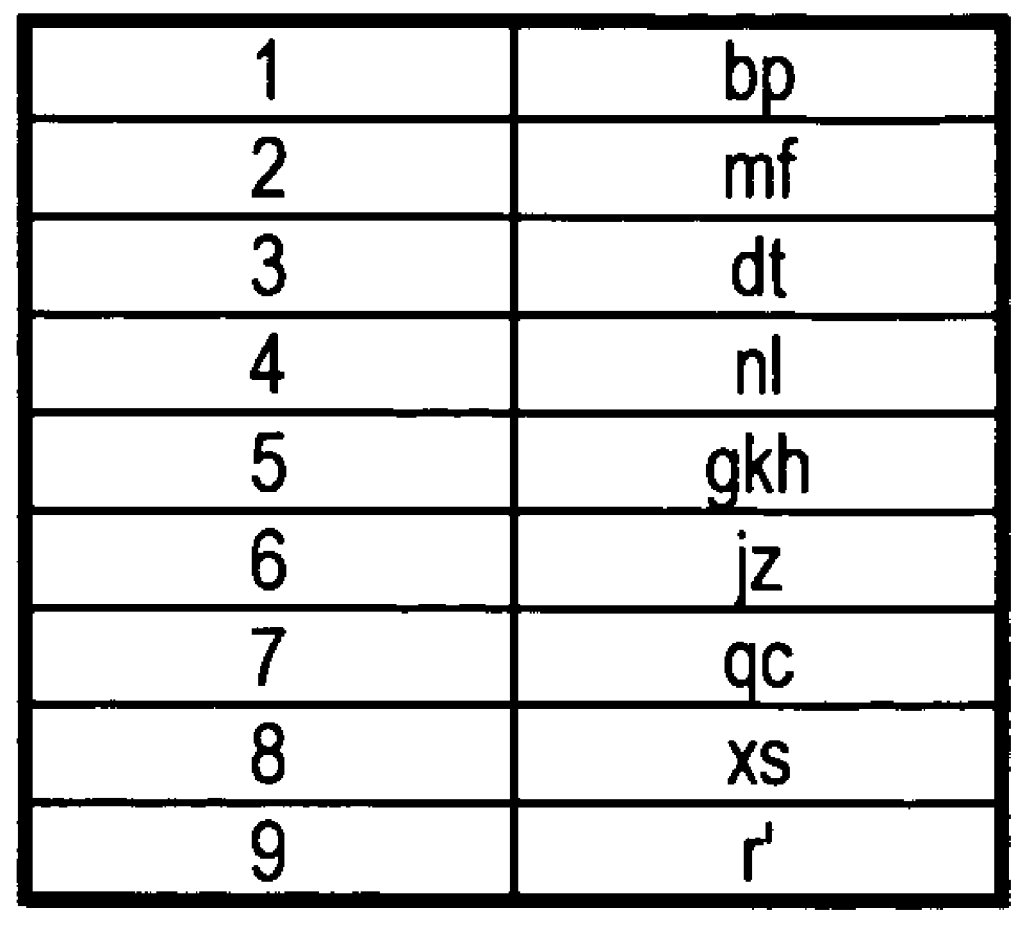

Therefore, the embodiment classifies the initials including the zero initial into nine initial groups (bp, mf, dt, nl, gkh, jz, qc, xs, r'). The symbol "'" represents the zero initial. FIG. 5 shows a table that defines relationship between the initial groups and the button codes of the buttons to which the respective initial groups are assigned (initial group display table 31). One keystroke using twelve buttons can narrow down the initials to one initial group including two or three initials. In the following description, the step for specifying the initial group is referred to as a "initial selecting step".

Step for Selecting Complex Initial

Further, the embodiment classifies the semi-vowels into three kinds by a new idea on the basis of the definition of the Chinese phonemics. And the vowel groups are classified into three final groups based on the semi-vowels to which the finals can be connected. That is, the simple final "i" is regarded as a semi-vowel and the "i semi-vowel" of the Chinese phonemics is re-defined as an "I semi-vowel" containing the simple final "i". In the similar manner, the simple finals "u" and "u umlaut" are regarded as semi-vowels and the "u semi-vowel" of the Chinese phonemics is re-defined as a "U semi-vowel" containing the simple finals "u" and "u umlaut".

Further, the finals ("a", "o", "e", "^e", and complex finals with zero semi-vowels) that cannot be connected with the "I semi-vowel" and "U semi-vowel" are regarded that they connect with "zero semi-vowels", and the "zero semi-vowel" is also defined as one of semi-vowels. All the finals are classified into three final groups by the re-defined semi-vowels to which the finals are connected. That is, there are a "final with zero semi-vowel group" containing finals that can be connected with the "zero semi-vowel", a "final with I semi-vowel group" containing finals that can be connected with only the "I semi-vowel" and a "final with U semi-vowel group" containing finals that can be connected with only the "U semi-vowel". A first-class group of finals includes the "final with I semi-vowel group" and "final with U semi-vowel group". A second-class group of finals includes the "final with zero semi-vowel group".

FIG. 7 shows the finals of the "final with zero semi-vowel group" (a zero semi-vowel connection table 331 that defines the connections of complex initials and finals with zero semi-vowels) In this table, each final of the "final with zero semi-vowel group" is assigned to the column corresponding to the button code of the button in the twelve buttons. Further, the rows of the table are assigned to the initials and the complex initials that connect with the "zero semi-vowel", respectively. In the same manner, FIG. 8 shows the finals of the "final with I semi-vowel group" (an I semi-vowel connection table 332 that defines the connections of complex initials and the finals with I semi-vowels). In this table, each final of the "final with I semi-vowel group" is assigned to the column corresponding to the button code of the button in the twelve buttons. Further, the rows in the table are assigned to the initials and the complex initials that connect with the "I semi-vowel", respectively. In the same manner, FIG. 9 shows the finals of the "final with U semi-vowel group" (a U semi-vowel connection table 333 that defines the connection of complex initials and the finals with U semi-vowels). In this table, each final of the "final with U semi-vowel group" is assigned to the column corresponding to the button code of the button in the twelve buttons. Further, the rows in the table are assigned to the initials and the complex initials that connect with the "U semi-vowel", respectively. Since there are some impossible combinations of consonant glides and finals, the available combinations are marked by "O" (final available information) in the respective tables.

As shown in these tables, the number of the finals in the "final with zero semi-vowel group" is twelve, the number of the finals in the "final with I semi vowel group" is ten and the number of the finals in the "final with U semi vowel group" is ten. Therefore, a final can be specified by one stroke with twelve buttons after one of the final groups has been selected.

On the other hand, if the finals are classified into two final groups, since the number of the final in each final group exceeds twelve, it becomes impossible to specify a final by one stroke.

Further, if the finals are classified into four or more final groups, while the number of finals in each final group can be fewer, the choice of the final groups become large, which increases the number of buttons required to select the final group. In addition, extra symbols to identify the kinds of semi-vowels must be prepared.

On the contrary, when the finals are classified into three groups as the embodiment, extra symbols are not required to identify the final groups. That is, since the finals in the "final with I semi-vowel group" have an initial vowel "i" in Pinyin, the finals in the "final with I semi-vowel group" can be identified by a character string that consists of Pinyin "i" and a symbol "-" representing "semi-vowel". Further, since the finals in the "final with U semi-vowel group" have an initial vowel "u" or "u umlaut" in Pinyin, the finals in the "final with U semi-vowel group" can be identified by a character string that consists of Pinyin "u" and a symbol "-" representing "semi-vowel". Still further, since the finals in the "final with zero semi-vowel group" have initial vowels other than "i", "u", "u umlaut", the finals in the "final with zero semi-vowel group" can be identified by a character string that consists of a symbol "-" representing "semi-vowel".

In this embodiment, at the next step (the complex initial selecting step) after any initial group is selected at the initial selecting step, one complex initial is selected from the complex initials that are combinations of two or three initials in the selected initial group and the respective semi-vowels. Since there are three final groups as described above, the theoretical number of the complex initials that become candidate at the same time is nine at the maximum. However, since there are some complex initials that do not exist actually (some complex initials do not connect with any final), the actual number of the complex initials that become candidate at the same time is four through seven. Accordingly, one complex initial can be specified from the selected initial group by one keystroke with twelve buttons. That is, one initial and one final group can be specified by one keystroke.

Incidentally, the complex initials are not assigned to five through eight buttons in the twelve buttons at the complex initial selecting step. Thus, frequently used syllables (predetermined syllables) are selected from the syllables that consist of the simple finals and the respective initials in the initial group selected at the initial selecting step and are assigned to the remaining buttons. FIG. 6 is a table showing relationships between the candidates (complex initials and the predetermined syllables) at the complex initial selecting step after one initial group is selected at the initial selecting step and the button codes of the buttons to which the candidates are assigned (a complex-initial-and-single-vowel-syllable display table 32). Each row of the table corresponds to the button code of the button to which the initial group selected at the initial selecting step is assigned. Each column of the table corresponds to the complex initials and the predetermined syllables assigned to the respective buttons at the complex initial selecting step. As shown in the table, since the predetermined syllables consist of Pinyin only and not include the symbol "-", they are distinct from the complex initials. When one of buttons to which the predetermined syllables are assigned is pressed, the corresponding predetermined syllable is specified and input. In such a case, the next step will be omitted.

<Final Selecting Step>

In the embodiment, at the next step (it is referred to as a "final selecting step") after one of the complex initials is specified at the complex initial selecting step, one of the finals that can be connected with the specified complex initial can be specified by pressing one of the buttons to which the finals are assigned. The assigned finals are defined in the table (the zero semi-vowel connection table 331, the I semi-vowel connection table 332 or the U semi-vowel connection table 333) corresponding to the semi-vowel in the specified complex initial as the finals that can be connected with the specified complex initial.

When any one final is specified, a syllable to be input is determined by connecting the newly specified final with the complex initial after the semi-vowel is erased from the complex initial that have been already specified.

<Structure of Cellular Phone>

Next, the structure of a cellular phone that is an information device to which the Chinese character input method of the embodiment is applied.

Figure 2:
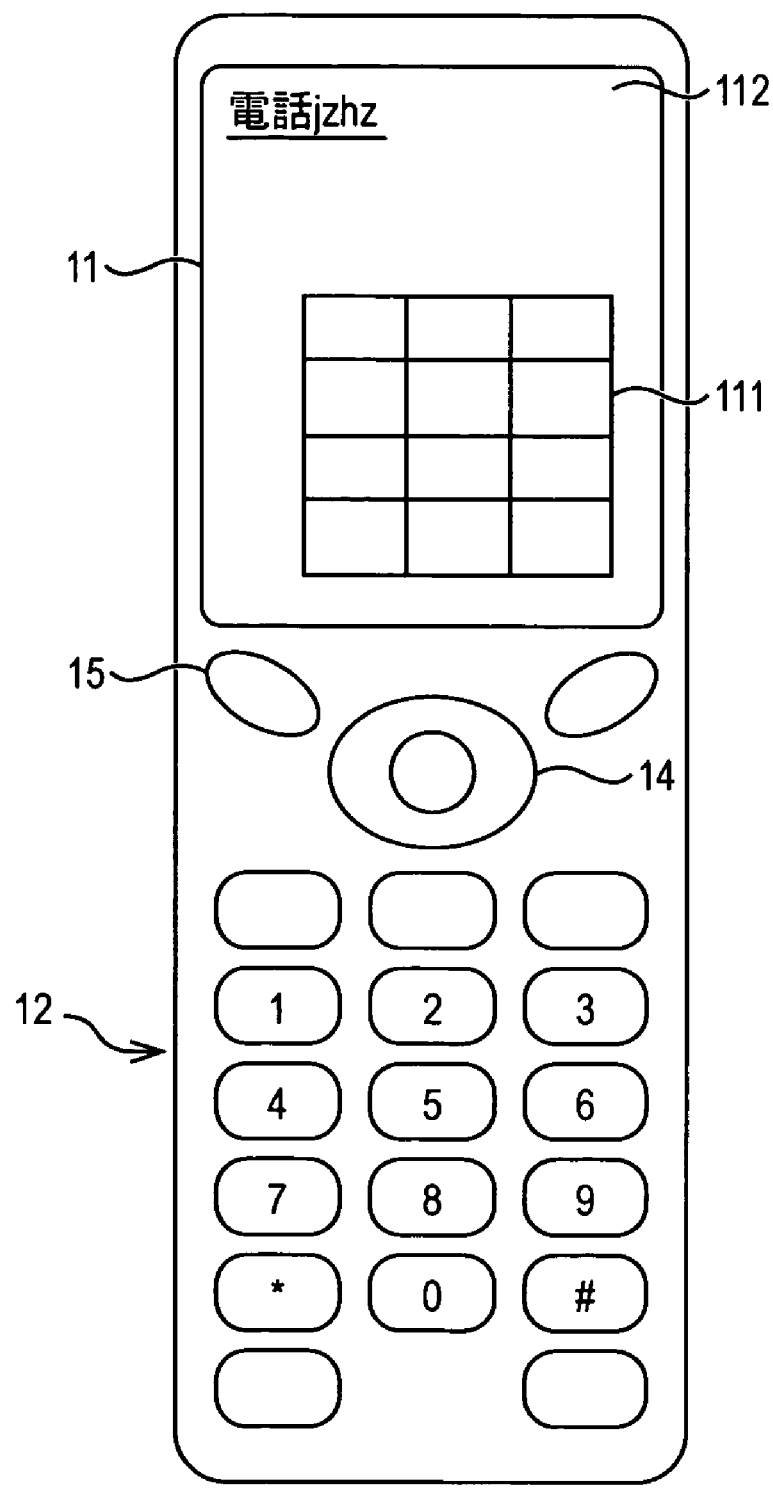
FIG. 2 is a plan view showing an appearance of a cellular phone.

FIG. 1 is a block diagram showing electric structure of the cellular phone and FIG. 2 is a plan view showing an appearance of the cellular phone.

The cellular phone 1 of the embodiment includes a controller 20 and a display 11, an input portion 12, a cursor key 14, a mode changeover button 15 and a data portion 30 that are connected to the controller 20. Although FIG. 1 shows the parts corresponding to the Chinese character input device in the cellular phone 1 only, the cellular phone 1 has various parts (not shown) to perform normal functions (a radio call function, a radio mail transmission and reception function) are built therein.

The mode changeover button 15 changes an input mode among a telephone number input mode (one numeral is input by one keystroke), an alphanumeric character input mode (one character is confirmed and input by two keystrokes) and a Chinese character input mode (one syllable is confirmed and input by two or three keystrokes)

The input portion 12 has twelve buttons that forms four-by-three matrix, and it notifies the button code of the pressed button to the controller 20.

The display 11 is a liquid-crystal display for example, it can indicate Chinese characters, alphanumeric characters and symbols. The condition of the display 11 varies according to the input mode. In the Chinese character input mode, the display 11 will be separated into an input candidate display area 111 and an input history display area 112. In the input candidate display area 111, the contents of the input candidates (initial groups, syllables and complex initials) assigned to the respective buttons of the input portion 12 are displayed at the corresponding positions of the buttons. In the input history display area 112, Pinyin that has been input and Chinese characters (not confirmed) are displayed.

The cursor key 14 is operated to change a Chinese character displayed in the input history display area 112 as a conversion candidate based on Pinyin input by the operation of the input portion 12 or to scroll conversion candidates (replacing with the next candidate).

The controller 20 consists of a ROM (Read Only Memory, not shown) that stores the Chinese character input program 23, a CPU (Central Processing Unit, not shown) that reads and executes the Chinese character input program 23, a phoneme buffer 21 that temporally stores the data when the CPU executes the process according to the program, and a RAM (Random Access Memory, not shown) on which an input step flag 22 is developed.

The phoneme buffer 21 memorizes the history of keystrokes of the input portion 12 in the Chinese character input mode so that the controller 20 can go back to the previous step when a predetermined back key is pressed.

Further, the input step flag 22 is used to record the current step in the Chinese character input mode.

The data portion 30 consists of a ROM (memory, not shown) and stores the various tables that are referred by the CPU during the execution of the Chinese character input program 23. The data portion 30 includes the initial group display table (the third table) 31, the complex-initial-and-single-vowel-syllable display table (the second table) 32, and the total connection table 33 (the first table) of complex initials and finals. The total connection table 33 includes the zero semi-vowel connection table 331, the I semi-vowel connection table 332 or the U semi-vowel connection table 333.

The Chinese character input program 23 stored in the ROM of the controller 20 has an input module 24 and a conversion module 25. The input module 24 determines each Chinese character input method described above. The conversion module 25 retrieves the candidate Chinese characters corresponding to the syllable determined by the input module 24 and confirms one Chinese character.

Figure 4:
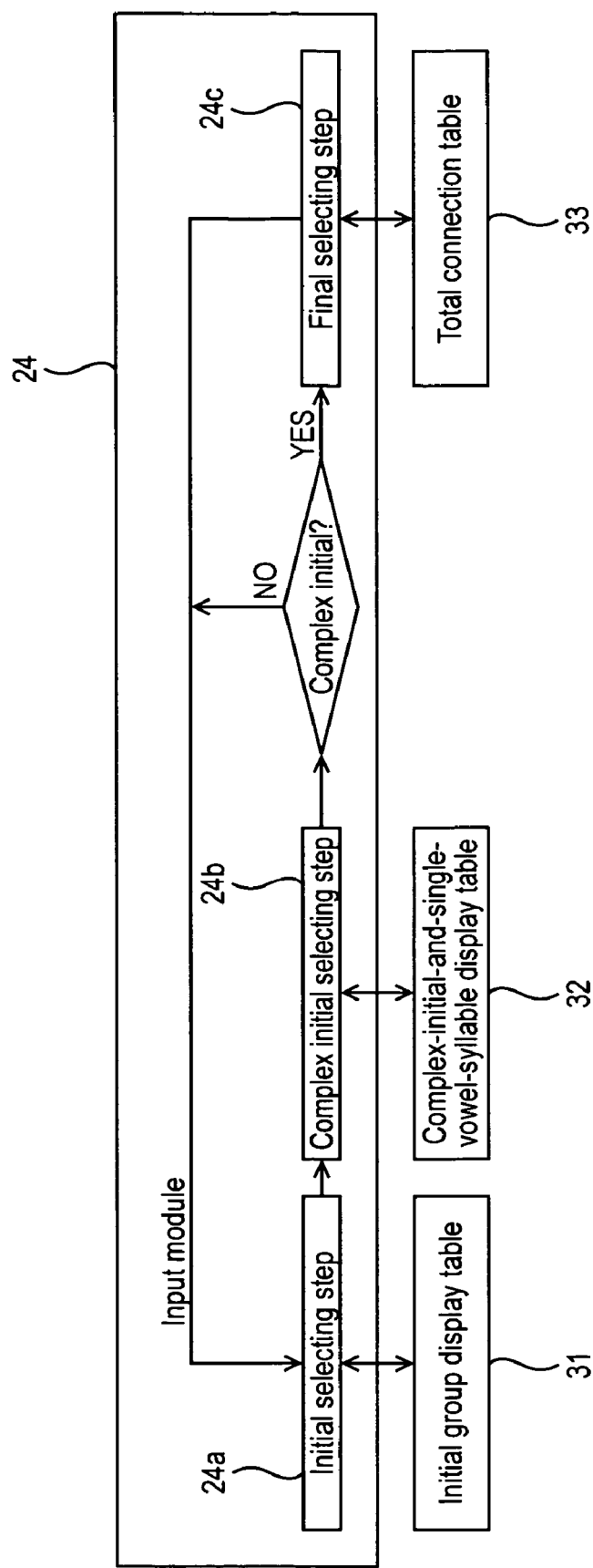
FIG. 4 is a block diagram showing the software structure of an input module of a Chinese character input program.

FIG. 4 is a block diagram showing the software structure of the input module 24 of the Chinese character input program 23. The input module 24 includes code segments 24a, 24b and 24c corresponding to the initial selecting step, the complex initial selecting step and the final selecting step, respectively. The initial selecting step 24a corresponds to the first step, the first specifying step, the first specifying portion, the first present procedure and the initial group specifying procedure. The complex initial selecting step 24b corresponds to the second step, the second specifying portion, the second present procedure, the complex initial specifying procedure and the syllable determination procedure. The final selecting step 24c corresponds to the third step, the third specifying step, the determination portion, the third present procedure and the syllable determination procedure. These initial selecting step 24a, the complex initial selecting step 24b and the final selecting step 24c are sequentially repeated.

The code segment corresponding to the initial selecting step 24a refers to the initial group display table 31 and assign the respective initial groups defined in the table 31 to the buttons so that the code number of the button is coincident with the number defined for the initial group. Then, the code segment displays the initial groups at the positions corresponding to the assigned buttons in the input candidate display area 111 of the display 11. When an operator presses any button, the initial group (two or three initials) assigned to the pressed button is specified.

The code segment corresponding to the complex initial selecting step 24b refers the complex-initial-and-single-vowel-syllable display table 32 and reads the contents of the row corresponding the initial group specified at the initial selecting step 24a (actually, the button code of the pressed button). Then, the code segment assigns the complex initials and single-vowel syllables to the corresponding buttons in the columns, and displays the candidates at the positions corresponding to the assigned buttons in the input candidate display area 111 of the display 11 as shown in FIGS. 11A through 11I. FIG. 11A shows the complex initials and the single-vowel syllables displayed in the input candidate display area 111 when the initial group "b, p" is specified. FIG. 11B shows the complex initials and the single-vowel syllables displayed in the input candidate display area 111 when the initial group "m, f" is specified. FIG. 11C shows the complex initials and the single-vowel syllables displayed in the input candidate display area 111 when the initial group "d, t" is specified. FIG. 11D shows the complex initials and the single-vowel syllables displayed in the input candidated is play area 111 when the initial group "n, l" is specified. FIG. 11E shows the complex initials and the single-vowel syllables displayed in the input candidate display area 111 when the initial group "g, k, h" is specified. FIG. 11F shows the complex initials and the single-vowel syllables displayed in the input candidate display area 111 when the initial group "j, z(zh)" is specified. FIG. 11G shows the complex initials and the single-vowel syllables displayed in the input candidate display area 111 when the initial group "q, c(ch)" is specified. FIG. 11H shows the complex initials and the single-vowel syllables displayed in the input candidate display area 111 when the initial group "x, s(sh)" is specified. FIG. 11I shows the complex initials and the single-vowel syllables displayed in the input candidate display area 111 when the initial group "r" is specified. In the respective drawings, a complex initial that consists of Pinyin and the symbol "-" is displayed in a shaded region and a single-vowel syllable that consists of Pinyin only is displayed in a white region.

When the operator presses any button, the code segment corresponding to the complex initial selecting step 24b specifies the complex initial or the single-vowel syllable assigned to the pressed button. When the single-vowel syllable is specified, the code segment confirms the syllable and sends it to the conversion module 25. On the other hand, when the complex initial is specified, the code segment corresponding the complex initial selecting step 24b sends the specified complex initial to the code segment corresponding to the final selecting step 24c.

The code segment corresponding to the final selecting step 24c refers to the total connection table 33 in response to the semi-vowel in the complex initial specified at the complex initial selecting step 24b. That is, if it is the zero semi-vowel, the code segment refers to the zero semi-vowel connection table 331, if it is I semi-vowel, the code segment refers to the I semi-vowel connection table 332, or if it is U semi-vowel, the code segment refers to the U semi-vowel connection table 333. Anyway, the code segment reads the contents of the column corresponding to the complex initial from the table.

Then, the code segment corresponding to the final selecting step 24c assigns the finals included in the column to the buttons and displays them at the positions corresponding the assigned buttons in the input candidate display area 111 of the display 11.

FIG. 12A shows the finals read from the zero semi-vowel connection table 331 displayed in the input candidate display area 111. FIG. 12B shows the finals read from the I semi-vowel connection table 332 displayed in the input candidate display area 111. FIG. 12C shows the finals read from the U semi-vowel connection table 333 displayed in the input candidate display area 111. Actually, all the combinations are not available as shown in FIG. 7 through FIG. 9, but FIGS. 12A, 12B and 12C show the all finals for reference purpose. In addition, the input candidate display area 111 may displays syllables determined by connecting the finals with the complex initial after the semi-vowel is erased from the specified complex initial instead of displaying the finals.

When the operator presses any button, the code segment corresponding to the final selecting step 24c specifies the final assigned to the pressed button and connects the specified final with the initial that is reconstructed by erasing the semi-vowel from the complex initial specified at the complex initial selecting step 24b. In this manner, the code segment corresponding to the final selecting step 24c determines the syllable and sends it to the conversion module 25.

Back to the description of FIG. 1, the conversion module 25 retrieves a frequently used Chinese character (a Chinese character with the highest probability that follows a precedence Chinese character as the context) corresponding to the syllable (Pinyin) received from the input module 24 from a dictionary (not shown) and displays the retrieved Chinese character in the input history display area 112.

<Process Contents of the Program>

Figure 13:
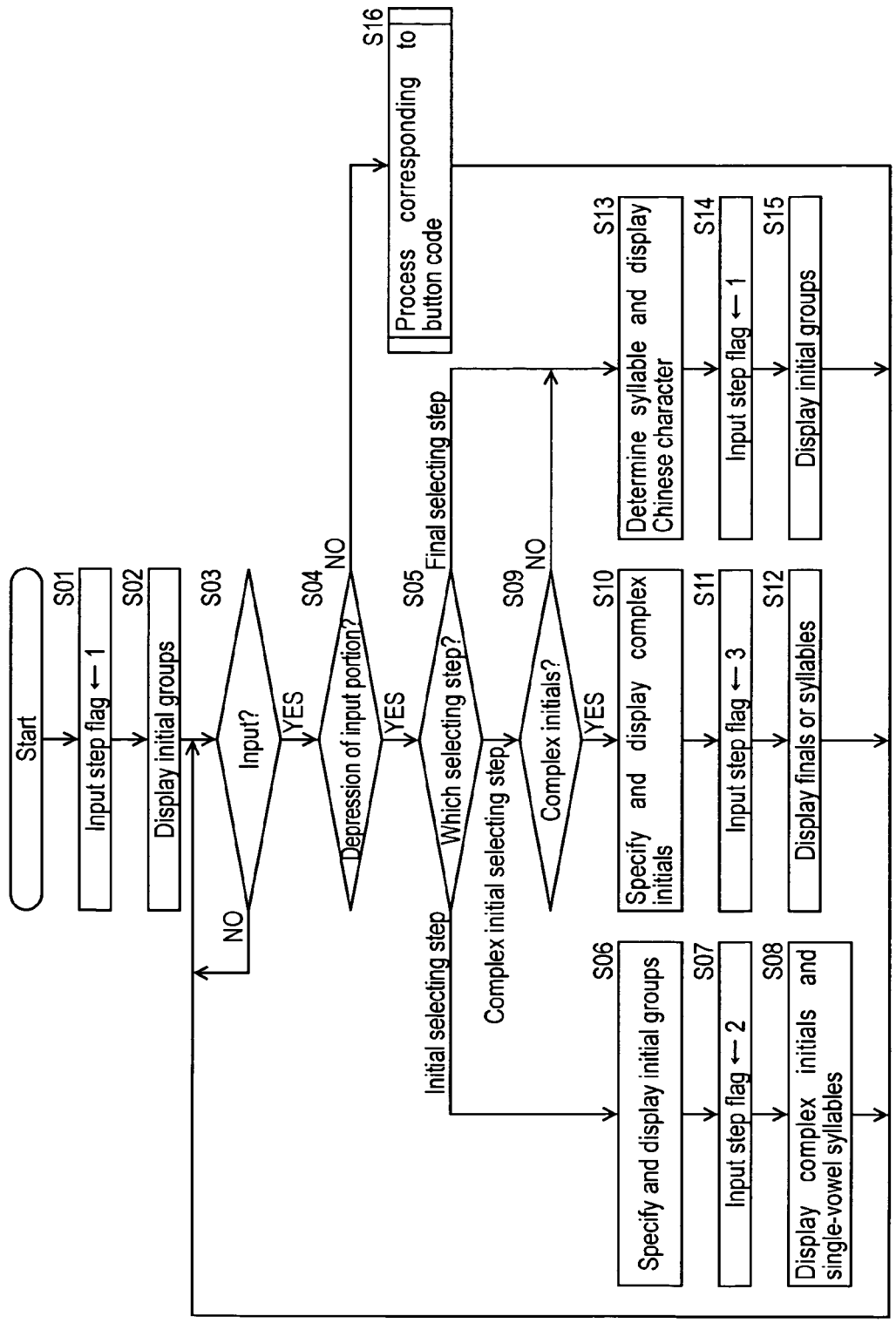
FIG. 13 is a flowchart showing a process of a controller according to the Chinese character input program.

Hereinafter, the process contents of the controller 20 according to the input module 24 of the Chinese character input program 23 will be concretely described with the process contents according to the related conversion module 25 with reference to the flowchart shown in FIG. 13. The process shown in the flowchart starts at the time when the input mode is changed to the Chinese character input mode and finishes at the time when the input mode is changed from the Chinese character input mode to another input mode.

The controller 20 sets the value of the input step flag 22 during operation of the flowchart. The controller 20 can recognize which step is currently executed among the initial selecting step, the complex initial selecting step and the final selecting step by referring the value of the input step flag. That is, the value of the input step flag is "1", the controller recognizes the current step is the initial selecting step. The value "2" shows the complex initial selecting step and the value "3" shows the final selecting step.

At the initial step S01, the controller 20 sets the value "1" to the input step flag 22. That is, the initial selecting step is set.

Figure 10:
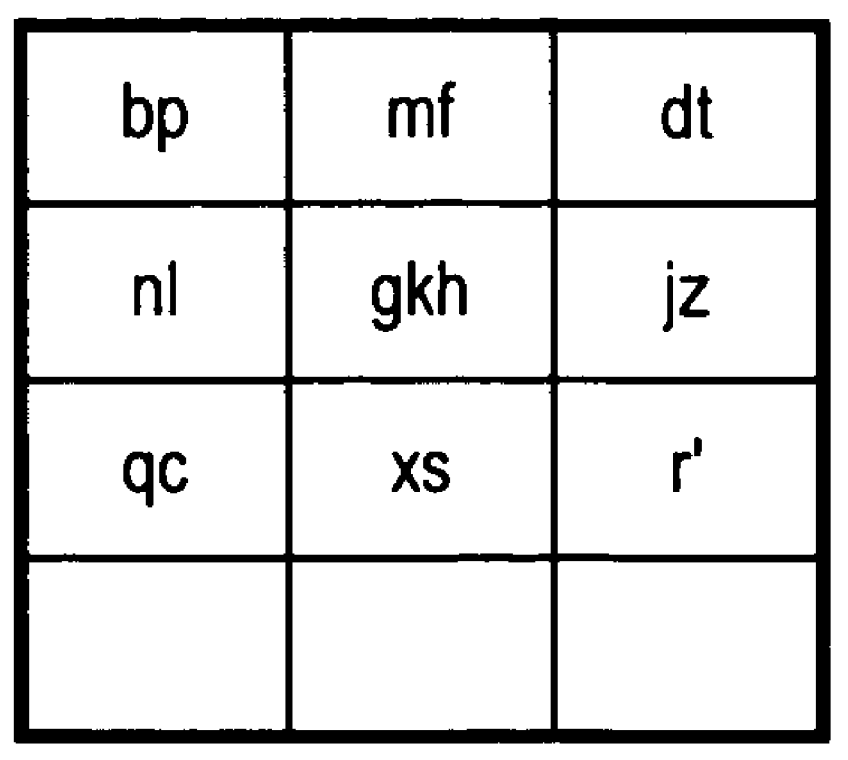

At S02, the controller refers to the initial group display table 31 (FIG. 5), assigns the initial groups as the candidates to the buttons of the input portion 12, respectively, and display the candidate in the input candidate display area 111 (see FIG. 10). After the process at S02 is completed, the controller 20 enters the loop process from S03 to S16 to execute the process according to the contents input by an operator.

At the first step S03 in the loop process, the controller 20 waits until the operator presses any button. When any button is pressed by the operator, the controller 20 brings the process to S04.

At the next step S04, the controller 20 judges whether the any button of the input portion 12 is pressed or the other operations. The other operations includes the depressions of the back key, the cursor key 14 that is used by the conversion module, the operation control key or the like. When the any button of the input portion 12 is pressed, the controller 20 brings the process to S05. In the case of the other operations, the controller 20 brings the process to S16.

At S05, the controller 20 checks the value of the input step flag 22 to determine which step is currently executed among the initial selecting step, the complex initial selecting step and the final selecting step. When the initial selecting step is executed (value="1"), the controller 20 brings the process to S06. When the complex initial selecting step is executed (value="2"), the controller 20 brings the process to S09. When the final selecting step is executed (value="3"), the controller 20 brings the process to S13.

At S06, the controller 20 searches the initial group display table 31 based on the button code of the button (1 through 9, *, 0, #) in the input portion 12 to retrieve the consonant group corresponding to the button code and display the character representing the initial group in the input history display area 112.

At the next step S07, the controller 20 stores the button code of the pressed button into the phoneme buffer 21 and sets the value "2" to the input step flag 22.

At the next step S08, the controller 20 reads the contents of the row in the complex-initial-and-single-vowel-syllable display table 32 (FIG. 6) corresponding to the button code stored in the phoneme buffer 21. Then the controller 20 assigns the complex initials and single-vowel syllables, which are candidates at the next complex initial selecting step 24b, to the buttons of the input portion 12 and displays the candidates in the input candidate display area 111 (see FIG. 11A through FIG. 11I). After finishing S08, the controller 20 brings the process back to S03.

On the other hand, at S09 that is executed in the complex initial selecting step, the controller 20 searches the complex-initial-and-single-vowel-syllable display table 32 based on the button code of the button pressed by the operator to specify the complex initial or the single-vowel syllable. When the single-vowel syllable is specified, the controller 20 brings the process to Sl3. When the complex initial is specified, the controller brings the process to S10.

At S10, the controller 20 displays the complex initial specified by the operator in the input history display area 112 instead of the initial group that has been displayed in the same area.

At the next step S11, the controller 20 stores the complex initial specified by the operator into the phoneme buffer 21 and sets the value "3" in the input step buffer 22.

At the next step S12, the controller 20 refers to the total connection table 33 in response to the semi-vowel included in the complex initial stored in the phoneme buffer 21 at S11. Specifically, when the complex initial store in the phoneme buffer 21 includes zero semi-vowel (when the symbol "-" does not exist just before "i", "u"), the controller 20 refers to the zero semi-vowel connection table 331. When the complex initial store in the phoneme buffer 21 includes I semi-vowel, the controller 20 refers to the I semi-vowel connection table 332. When the complex initial store in the phoneme buffer 21 includes U semi-vowel, the controller 20 refers to the U semi-vowel connection table 333.

The controller 20 reads the finals on the row corresponding to the complex initial stored in the phoneme buffer 21 from the referred total connection table 33. Then, the controller 20 assigns the finals to which the final available information is set to the buttons of the input portion 12, respectively, and displays the finals in the input candidate display area 111 (see FIG. 12A through FIG. 12C). After finishing S12, the controller 20 brings the process back to S03.

On the other hand, when the controller 20 determines that the operator specifies the single-vowel syllables at S09, or when the controller 20 determines that the final selecting step is currently executed at S05, the controller 20 determines the input syllable at S13. Specifically, when the controller 20 determines that the single-vowel syllable is specified at S09, the single-vowel syllable specified at S09 is determined as the syllable that is input by the operator.

On the other hand, when the controller 20 determines that the final selecting step is executed at S05, the controller 20 specifies the final corresponding to the button of the input portion 12 pressed by the operator based on the row read from the total connection table 33 (the zero semi-vowel connection table 331, the I semi-vowel connection table 332, the U semi-vowel connection table 333) at the next previous step S12.

The controller 20 determines a syllable to be input by connecting the newly specified final with the initial that is obtained by erasing the semi-vowel from the complex initial stored in the phoneme buffer 21 at the next previous step S11. Further, the controller 20 sends the syllable determined with using the input module 24 to the conversion module 25 and obtains the candidate of the Chinese character corresponding to the syllable with using the conversion module 25. When there are a plurality of candidates of Chinese characters, the controller 20 obtains the frequently used Chinese character. Then, the controller 20 displays the obtained candidate of the Chinese character in the input history display area 112 instead of the complex initial that has been displayed in the same area.

At the next step S14, the controller 20 set the value "1" to the input step flag 22. Further, when the operator converts a Chinese character one by one, the phoneme buffer 21 is cleared.

At the next step S15, the controller 20 assigns the initial groups as the candidates to the button of the input portion 12, respectively, with reference to the initial group display table 31 (FIG. 5). The controller 20 also displays the initial groups in the input candidate display area 111 (see FIG. 10). After finishing S15, the controller 20 brings the process back to S03.

On the other hand, when the operation other than the input portion 12 is detected at S04, the controller 20 executes the process corresponding to the input contents by the operator at S16. For instance, when the cursor key 14, which is used in the conversion module 25, is operated, the controller 20 executes a process such as a selection of the Chinese character according to the function defined for the cursor key 14. After finishing S16, the controller 20 brings the process back to S03.

Operation of the Embodiment

As described above, the Chinese character input device of the embodiment can specify any syllable that consists of an initial and a final in the standard pronunciation with three keystrokes of the buttons of the input portion 12. Further, predetermined numbers of frequently used single-vowel syllables can be specified with two keystrokes. The single vowel syllables that are specified by two keystrokes are defined in the complex-initial-and-single-vowel-syllable display table 32. Specifically, they includes eight single-vowel syllables that become candidates when the initial group "bp" is selected at the initial selecting step 24a, eight single-vowel syllables that become candidates when the initial group "mf" is selected, six single-vowel syllables that become candidates when the initial group "dt" is selected, six single-vowel syllables that become candidates when the initial group "nl" is selected, six single-vowel syllables that become candidates when the initial group "gkh" is selected, six single-vowel syllables that become candidates when the initial group "jz" is selected, six single-vowel syllables that become candidates when the initial group "mf" is selected, six single-vowel syllables that become candidates when the initial group "xs" is selected and five single-vowel syllables that become candidates when the initial group "r" is selected.

Hereinafter, an actual input example to input Pinyin "dian hua ji" corresponding to "電話機" will be described with reference to FIGS. 14A through 14I. The syllable of the Chinese character "電" is "dian", and its complex initial is "di". In the embodiment, the complex initial is represented by "di-". The syllable of the Chinese character "話" is "hua", and its complex initial is "hu". In the embodiment, the complex initial is represented by "hu-". The syllable of the Chinese character "機" is "ji". Since the syllable "ji" is defined in the complex-initial-and-single-vowel-syllable display table 32, the syllable "ji" can be specified with two keystrokes.

Figure 14D:

FIGS. 14A through 14I show changes of contents displayed on the input candidate display area 111 and the input history display area 112 with keystrokes of the buttons of the input portion 12. FIG. 14A shows an initial screen of the Chinese character input mode. In the initial screen, the initial groups defined in the initial group display table 31 are displayed in the input candidate display area 111. No information is displayed in the input history display area 112.

When an operator presses the "3" button of the input portion 12 to select the consonant group "dt", the input candidate display area 111 and the input history display area 112 are changed to the condition shown in FIG. 14B. That is, "dt" is displayed in the input history display area 112. On the other hand, complex initials and single-vowel syllables that are defined in the row of "dt" in the complex-initial-and-single-vowel-syllable display table 32 are displayed in the input candidate display area 111.

When the operator presses the "4" button of the input portion 12 to select the complex initial "di-", the input candidate display area 111 and the input history display area 112 are changed to the condition shown in FIG. 14C. That is, "di-" is displayed in the input history display area 112 and the available finals on the row of "di-" in the I semi-vowel connection table 332 are displayed in the input candidate display area 111.

When the operator presses the "3" button of the input portion 12 to select the final "ian", the input candidate display area 111 and the input history display area 112 are changed to the condition shown in FIG. 14D. That is, the Chinese character "点" corresponding to the syllable "dian" is displayed in the input history display area 112. On the other hand, the initial groups defined in the initial group display table 31 are displayed in the input candidate display area 111 for inputting the next syllable.

Figure 14E:

When the operator presses the "5" button of the input portion 12 to select the initial group "gkh", the input candidate display area 111 and the input history display area 112 are changed to the condition shown in FIG. 14E. That is, the Chinese character "点" corresponding to the syllable that has been already input and the initial group "gkh" that is newly selected are displayed in the input history display area 112. On the other hand, the complex initials and the single-vowel syllables that are defined in the row of "gkh" in the complex-initial-and-single-vowel-syllable display table 32 are displayed in the input candidate display area 111.

Figure 14F:

When the operator presses the "9" button of the input portion 12 to select the complex initial "hu-", the input candidate display area 111 and the input history display area 112 are changed to the condition shown in FIG. 14F. That is, "点hu-" is displayed in the input history display area 112 and the available finals on the row of "hu-" in the U semi-vowel connection table 333 are displayed in the input candidate display area 111.

When the operator presses the "2" button of the input portion 12 to select the final "ua", the input candidate display area 111 and the input history display area 112 are changed to the condition shown in FIG. 14G. That is, the Chinese characters "電話" is displayed in the input history display area 112. Since the syllable "hua" is determined after the character "点" (dian), the conversion module 25 re-converts the syllables "dianhua" to "電話" On the other hand, the initial groups defined in the initial group display table 31 are displayed in the input candidate display area 111 for inputting the next syllable.

When the operator presses the "6" button of the input portion 12 to select the initial group "jz", the input candidate display area 111 and the input history display area 112 are changed to the condition shown in FIG. 14H. That is, the Chinese characters "電話" corresponding to the syllables that have been already input and the initial group "jz" that is newly selected are displayed in the input history display area 112. On the other hand, the complex initials and the single-vowel syllables that are defined in the row of "jz" in the complex-initial-and-single-vowel-syllable display table 32 are displayed in the input candidate display area 111.

When the operator presses the "1" button of the input portion 12 to select the single-vowel syllable "ji", the input candidate display area 111 and the input history display area 112 are changed to the condition shown in FIG. 14I. That is, "電話機" is displayed in the input history display area 112 corresponding to the syllables "dianhuaji" and the initial groups defined in the initial group display table 31 are displayed in the input candidate display area 111 for inputting the next syllable.

As described above, the first three keystrokes select "dt", "di-" and "ian", which determine the syllable "dian". Further, the next three keystrokes select "gkh", "hu-" and "ua", which determine the syllable "hua". Still further, the last two keystrokes select "jz" and "ji", which determine the syllable "ji".

As proved above, the Chinese character input device of the embodiment can specify any syllable that consists of an initial and a final in the standard pronunciation with two or three keystrokes using twelve buttons. Further, it has been confirmed that any syllables that consists of a zero initial and a final with two or three keystrokes using twelve buttons.

What is claimed is:

1. A Chinese input method comprising:
    first presenting, when an instruction is received from an operator, a plurality of groups into which initial-consonants of Chinese syllables are classified in a manner that each group is associated with a key, on one page of a screen;
    second presenting, when one group is selected from among the plurality of groups by the operator, all combinations of a phonetic symbol representing an initial-consonant included in the selected group and a symbolic sign indicating one of I semivowel, U semivowel, and zero semivowel, on the screen;
    third presenting, when one combination is selected from among all combinations by the operator and one initial-consonant is hereby settled, a plurality of final-vowels that include a semivowel related to the selected combination and which can be connected to the settled initial-consonant, on the screen; and
    displaying, when one final-vowel is selected from among the plurality of final-vowels by the operator and one final-vowel is hereby settled, phonetic symbols representing each of the settled initial-consonant and the settled final-vowel on the screen.

2. The Chinese input method according to claim 1,
    wherein the second presenting including presenting all combinations of the phonetic symbol and the sign, together with combinations of a phonetic symbol representing an initial-consonant included in the selected group and a phonetic symbol representing a simple final-vowel that can be connected to the initial-consonant included in the selected group.

3. The Chinese input method according to claim 1,
    wherein the phonetic symbols are alphabetic characters according to Pinyin method.

4. The Chinese input method according to claim 1,
    wherein the simple final-vowel, written by Pinyin method, has one of "a", "o", "e", "e circumflex", "i", "u", and "u umlaut" in prefix.

5. The Chinese input method according to claim 1,
    wherein the final-vowel including the I semivowel, written by Pinyin method, has "i" in prefix,
    wherein the final-vowel including the U semivowel, written by Pinyin method, has "u" or "u umlaut" in prefix, and
    wherein the final-vowel including the zero semivowel, written by Pinyin method, has a phonetic symbol except "i", "u", and "u umlaut" in prefix.

6. The Chinese input method according to claim 1,
    wherein the second presenting includes presenting all combinations based on a zero semivowel table, an I semivowel table, and a U semivowel table, the zero semivowel table storing, for each final-vowel including the zero semivowel, a plurality of initial-consonants to which the final-vowel can be connected, the I semivowel table storing, for each final-vowel including the I semivowel, a plurality of initial-consonants to which the final-vowel can be connected, and the U semivowel table storing, for each final-vowel including the U semivowel, a plurality of initial-consonants to which the final-vowel can be connected.

7. The Chinese input method according to claim 1,
    wherein the first presenting includes presenting the plurality of groups based on a initial-consonant table that stores final-consonants classified into the plurality of groups.

8. A Chinese input device comprising:
    a first presenting unit that presents, when an instruction is received from an operator, a plurality of groups into which initial-consonants of Chinese syllables are classified in a manner that each group is associated with a key, on one page of a screen;
    a second presenting unit that presents, when one group is selected from among the plurality of groups by the operator, all combinations of a phonetic symbol representing an initial-consonant included in the selected group and a symbolic sign indicating one of zero semivowel, I semivowel and U semivowel on the screen;
    a third presenting unit that presents, when one combination is selected from among all combinations by the operator and one initial-consonant is hereby settled, a plurality of final-vowels that include a semivowel related to the selected combination and which can be connected to the settled initial-consonant on the screen; and
    a displaying unit that displays, when one final-vowel is selected from among the plurality of final-vowels by the operator and one final-vowel is hereby settled, phonetic symbols representing each of the settled initial-consonant and the settled final-vowel on the screen.

9. A computer-readable medium encoded with a Chinese input program for making a computer function as an apparatus comprising:
    a first presenting unit configured to present, when an instruction is received from an operator, a plurality of groups into which initial-consonants of Chinese syllables are classified in a manner that each group is associated with a key, on one page of a screen;
    a second presenting unit configured to present, when one group is selected from among the plurality of groups by the operator, all combinations of a phonetic symbol representing an initial-consonant included in the selected group and a symbolic sign indicating one of zero semi-vowel1 I semivowel and U semivowel on the screen;
    a third presenting unit configured to present, when one combination is selected from among all combinations by the operator and one initial-consonant is hereby settled, a plurality of final-vowels that include a semivowel related to the selected combination and which can be connected to the settled initial-consonant, on the screen; and
    a displaying unit configured to display, when one final-vowel is selected from among the plurality of final-vowels by the operator and one final-vowel is hereby settled, phonetic symbols representing each of the settled initial-consonant and the settled final-vowel en-a on the screen.

* * * * *

UNITED STATES PATENT AND TRADEMARK OFFICE
CERTIFICATE OF CORRECTION

PATENT NO. : 7,711,541 B2  Page 1 of 1
APPLICATION NO. : 10/818636
DATED : May 4, 2010
INVENTOR(S) : Sugano It is certified that error appears in the above-identified patent and that said Letters Patent is hereby corrected as shown below:

Claim 9, Col. 16, Line 50   Delete "vowel1" and insert --vowel-- in its place.

Claim 9, Col. 16, Line 62   Delete "en-a".

Signed and Sealed this

Fifth Day of October, 2010

David J. Kappos
*Director of the United States Patent and Trademark Office*